(12) United States Patent
Yeh et al.

(10) Patent No.: US 7,636,541 B2
(45) Date of Patent: Dec. 22, 2009

(54) MOBILE PAPER GUIDE

(75) Inventors: Ming-Te Yeh, Danshuei Township, Taipei County (TW); Ken-Te Chou, Guanyin Township, Taoyuan County (TW); Ming-Chieh Chung, Yangmei Township, Taoyuan County (TW); Chung-Teng Huang, Sinjhuang (TW)

(73) Assignee: Teco Image Systems Co., Ltd., Taoyuan Hsien (TW)

( * ) Notice: Subject to any disclaimer, the term of this patent is extended or adjusted under 35 U.S.C. 154(b) by 383 days.

(21) Appl. No.: 11/121,047

(22) Filed: May 4, 2005

(65) Prior Publication Data
US 2006/0099017 A1    May 11, 2006

(30) Foreign Application Priority Data
Nov. 11, 2004   (CN) .................. 2004 1 0927288

(51) Int. Cl.
*G03G 15/00*   (2006.01)

(52) U.S. Cl. ........................ 399/367; 399/377
(58) Field of Classification Search .............. 399/367, 399/377
See application file for complete search history.

(56) References Cited

U.S. PATENT DOCUMENTS

| 5,879,000 | A | * | 3/1999 | Kakuta ................. 271/3.02 |
| 6,032,948 | A | * | 3/2000 | Peebles et al. ........... 271/224 |
| 6,199,855 | B1 | * | 3/2001 | Choeng et al. ........... 271/122 |
| 6,361,040 | B1 | * | 3/2002 | Itakura ................ 271/164 |
| 6,557,848 | B2 | * | 5/2003 | Hsiao et al. ............. 271/245 |

* cited by examiner

*Primary Examiner*—Anthony H. Nguyen

(57) ABSTRACT

A mobile paper guide in an automatic document feeder (ADF) is comprised of draft platen, motor, connection rod, and paper guide plate; the rod including a knob inserted onto the rod, an arm extending from the knob for the rod to rotate as driven by platen; the rod and the platen engaging turns against each other when the rod is limited; the plate movably disposed to the arm; ADF having a chute above the paper guide; and the paper guide moves up and down therein to retain and align paper sheet.

1 Claim, 8 Drawing Sheets

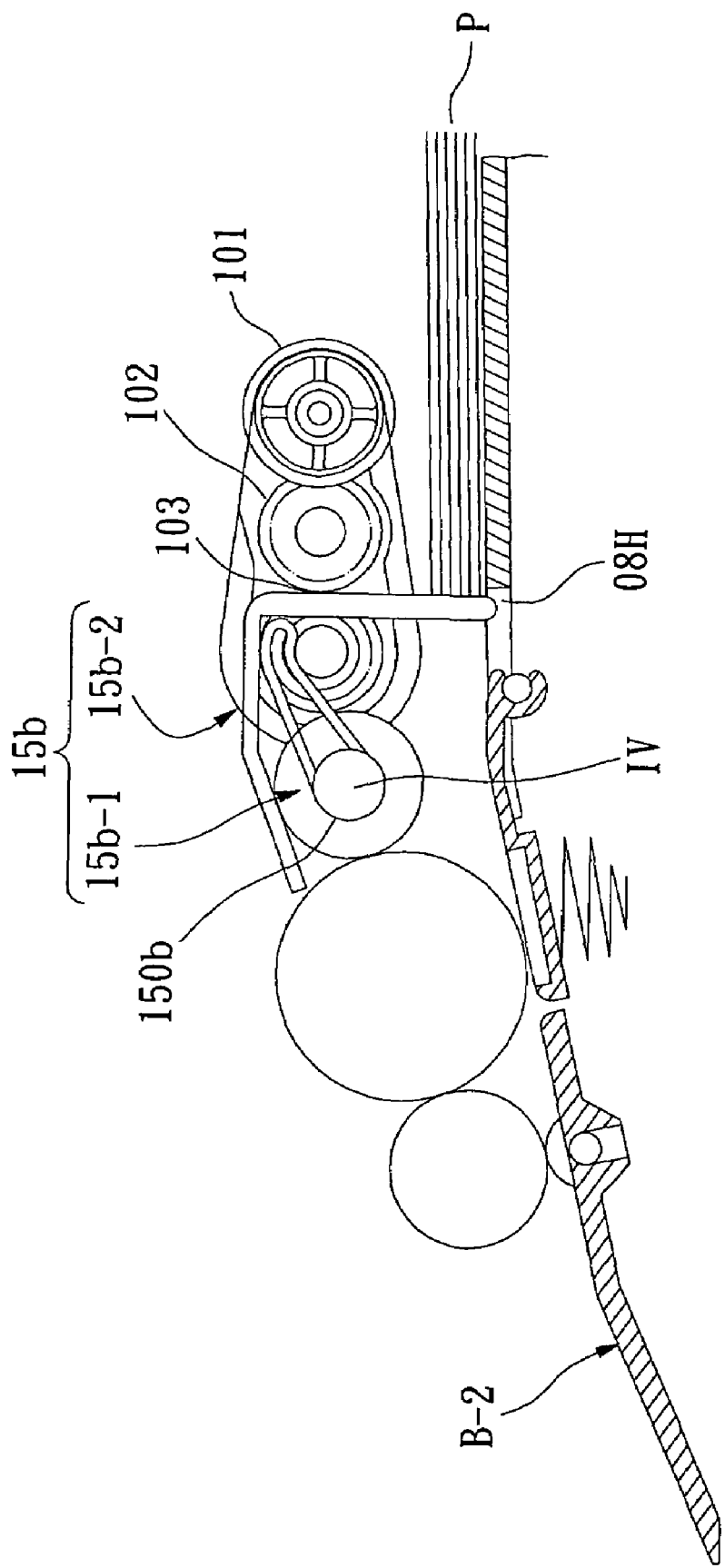
FIG.2.A
Prior Art

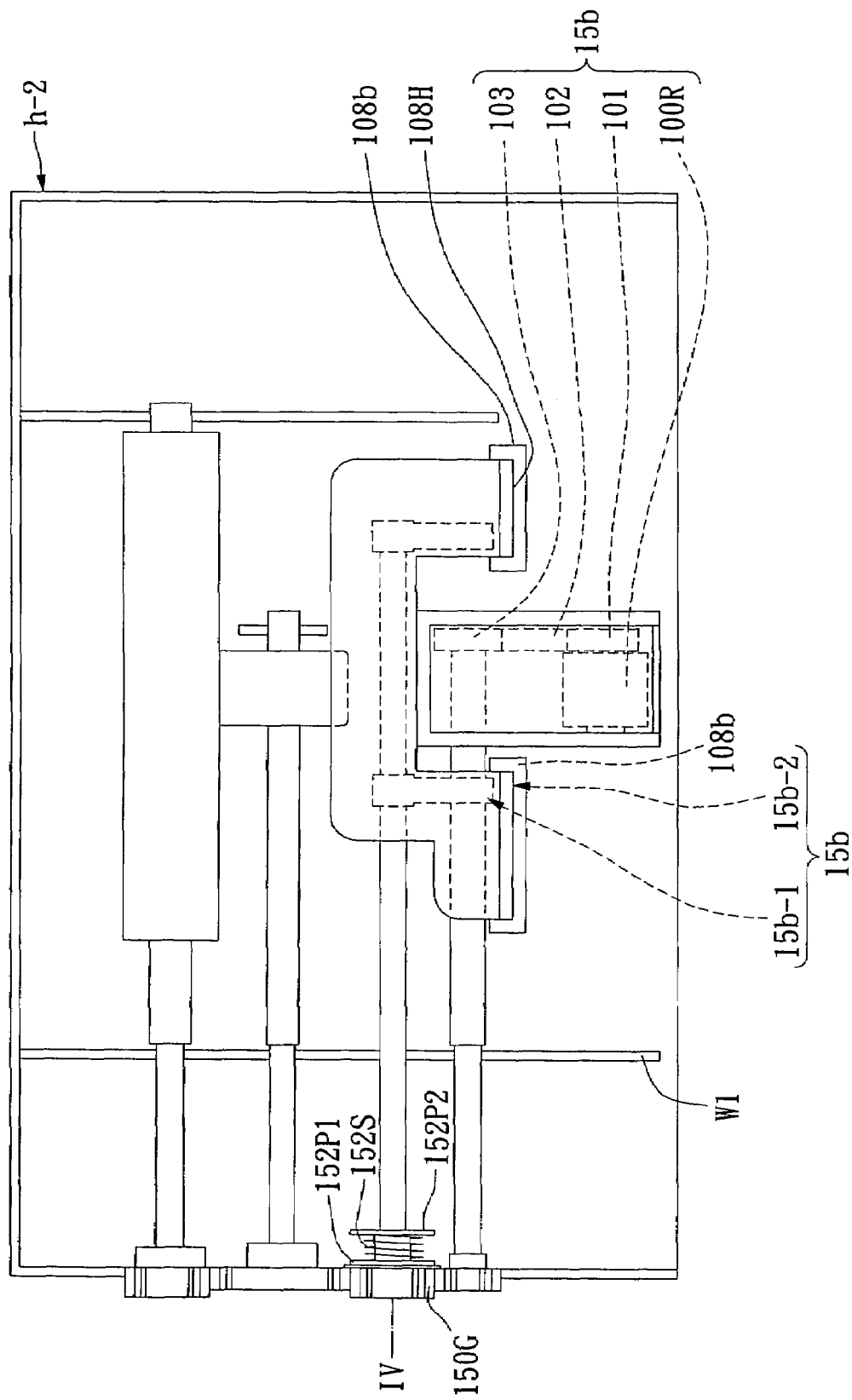
FIG.2.B
Prior Art

MOBILE PAPER GUIDE

BACKGROUND OF THE INVENTION (a) Field of the Invention

The present invention is related to a paper guide, and more particularly, to a mobile paper guide adapted to an automatic document feeder (ADF) to sort front edge of paper sheet.

(b) Description of the Prior Art

Automatic paper sent is one of the basic functions for many types of office machines. Therefore many office machines including facsimile machine, photocopier or scanner is provided with a mechanism of ADF to feed the paper sheets stored in paper tray into the machine. In the course of the transfer between two given locations, e.g., the paper tray and where inside the machine for the paper sheet fed pending for next process, a paper guide adapted to the ADF is usually used to retain and align the paper sheet. Referring to FIG. 1 of the accompanying drawing for a Mechanical Paper Guide disclosed in a U.S. patent, U.S. Pat. No. 6,557,848 B2, the mechanical paper guide to control the entrance of paper sheet into an ADF includes a platen 35a, a motor (not illustrated) for driving the platen 35a to rotate, a cam 32a, a paper guide arm 31a, and an elastic clip 33a. The cam 32a includes a first protruding block 321a and a second protruding block 322a. The cam 32a as driven by the platen 35a causes both of the first and the second protruding blocks 321a, 322a to rotate. A pin 3121a as the point subject to the force is provided on the paper guide arm 31a. The pin 3121a in responding to the push by the rotation of the first protruding block 321a causes the paper guide 31a to ascend. As the paper guide arm 31a is moving up, it is engaged by the elastic clip 33a thus to stay at paper feeding position. The elastic clip 33a in responding to the push by the rotation of the second protruding block 322a creates displacement to release the paper guide arm 31a for the latter to descend into a retaining position. However, as taught, the mechanical paper guide of the first prior art is comprised of too many components. The production cost is comparatively higher since all the components have to be made one by one with further consideration of the allowance between any two components and the individual location of all components must be in their exact location before confirming the state of assembly due to that all the locations of those components for assembly are different from one another. Therefore, the first prior art prevents the assembly in one step. Furthermore, with the increased variables during the assembly, any component falling out of place would fail the entire structure to attract more problems and increase service cost.

Now referring to FIGS. 2A and 2B for a Paper Feeding Installation & Method of a second prior art published under #TW568833 in Taiwan Gazette, a paper guide 15b as disclosed includes a cam 15b-1 and a guide plate 15b-2 on each of both sides of the paper guide 15b. The cam 15b-1 is provided on a platen 150b to turn around an axle center IV to stride over a housing W1. A torque limiting device 152b provided on another end of the platen 150b includes a first plate 152P1, a second plate 152P2, and an elastic member 152S. Wherein, the elastic member 152S contacts the platen 150b and a gear 150G as respectively compressed by the first plate 152P1 and the second plate 152P2. The guide plate 15b-2 relates to a plate in a shape approximating the letter L. One protruding end of the cam 15b-1 is compressed to contact the guide plate 15b-2 while multiple sheets of paper P are aligned and held in position by taking advantage of the side of the guide plate 15b-2. The guide plate 15b-2 is locally accommodated in two chutes 108b of a base housing H-2. The lower end of the guide plate 15b-2 is retained by both locking holes 108H respectively disposed in those two chutes 108b. The guide plate 15b-2 by sticking its lower end into both locking holes 108H achieves the purpose of aligning and positioning those multiple sheets of paper P. As taught by the second prior art, each of both sides of the paper guide 15b must be provided with the cam 15b-1 and the guide plate 15b-2. In the prior art, both guide plates 15b-2 are made integrated in one piece that provides the paper guide function from top in a striding fashion. However, in practice, the integrated guide plate 15b-2 is vulnerable to be deformed and warped to lean to either side that prevents both sides leveled, thus fail to provide sorting the paper sheet at the same time by both guide plates 15b-2. Furthermore, as multiple gears 10 are provided between two guide plates 15b-2, both guide plates 15b-2 are in fact not arranged in symmetric. As a result either guide plate 15b-2 provided with a longer swing arm could get easily fall out of position due to leverage effects to consume more service cost.

SUMMARY OF THE INVENTION

The primary purpose of the present invention is to provide a mobile paper guide adapted to an automatic document feeder to retain and sort the front edge of paper sheet for preventing the paper sheet from being jammed.

Another purpose of the present invention is to provide a mobile paper guide adapted to an automatic document feeder that requires no production or adaptation of additional power device to help lower the production cost by taking advantage of coupling to the inherited paper feeding motor of the office machine.

Another purpose yet of the present invention is to provide a mobile paper guide adapted to an automatic document feeder that prevents both ends of the paper guide becoming asymmetric due to deformation and avoids falling out of position due to leverage effects.

To achieve the purposes as described above, the present invention provides a mobile paper guide in an automatic document feeder (ADF) comprised of draft platen, motor, connection rod, and paper guide plate. Wherein, the rod includes a knob inserted onto the rod, and an arm extending from the knob for the rod to rotate as driven by platen. Both of the rod and the platen turn around against each other when the rod is limited. The plate is movably disposed to the arm and the ADF is provided with one or a plurality of chute in relation to where above the paper guide. The paper guide moves up and down in the chute to retain and align paper sheet.

BRIEF DESCRIPTION OF THE DRAWINGS

FIG. 2A is a bird's view of a paper guide of a second prior art.

FIG. 2B is a side view of the paper guide of the second prior art.

DETAILED DESCRIPTION OF THE PREFERRED EMBODIMENTS

Figure 1:
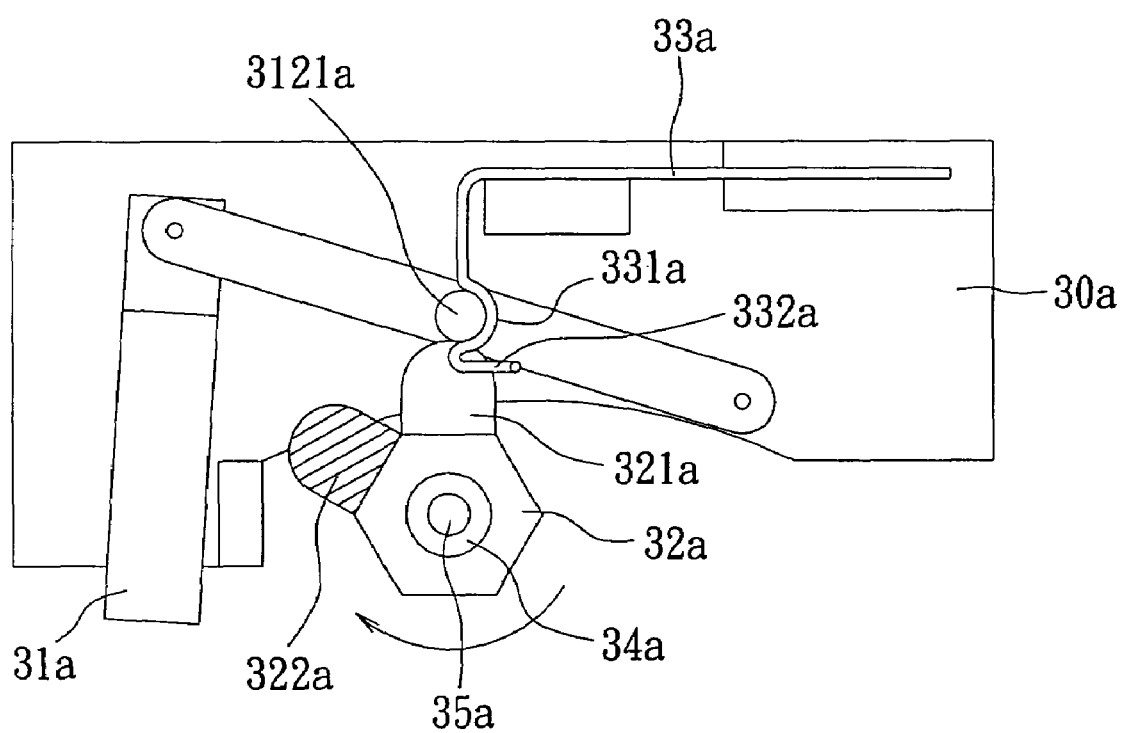
FIG. 1 is a sectional view of a mechanical paper guide of a first prior art.
Figure 3:
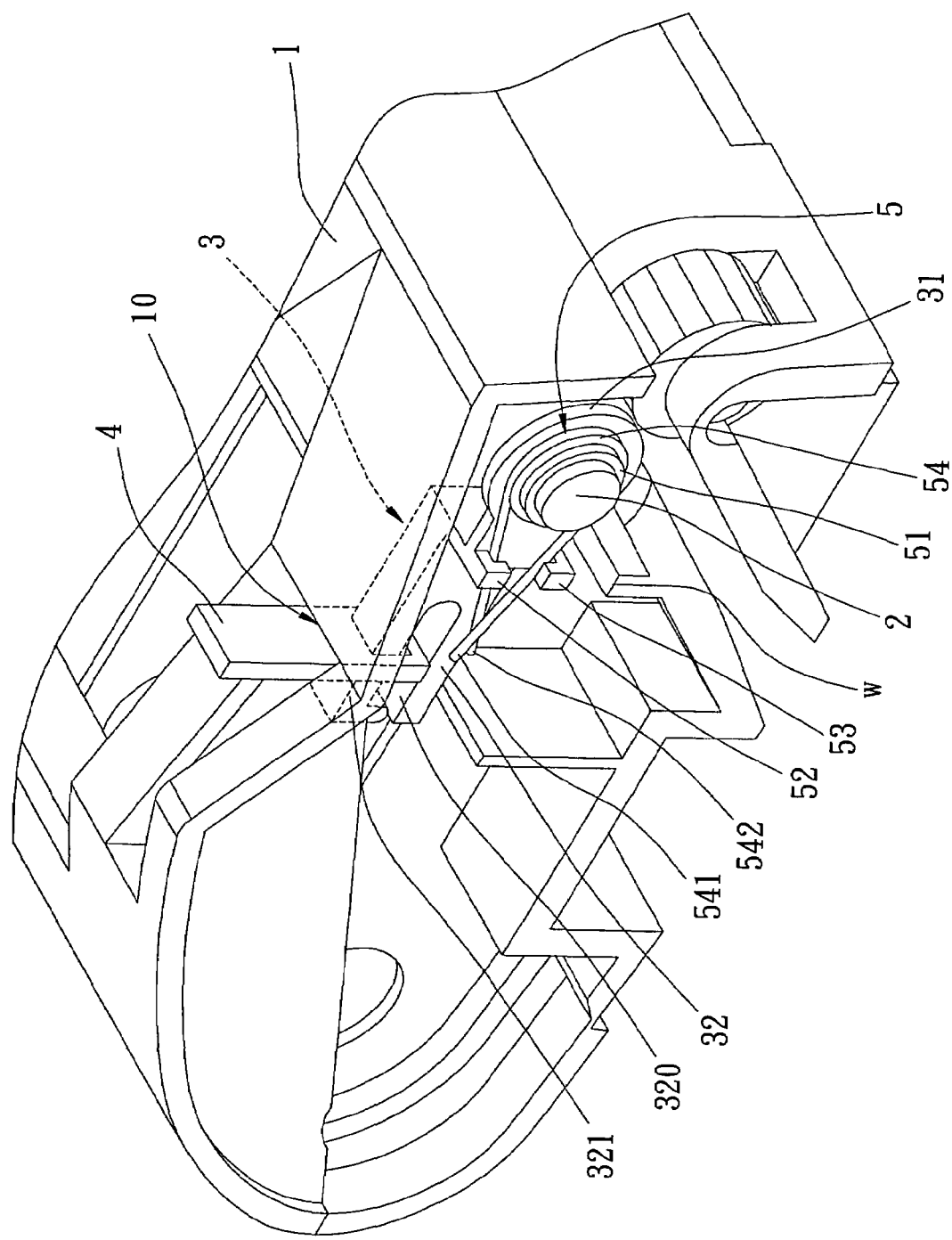
FIG. 3 is a side view of a mobile paper guide of the present invention.
Figure 4:
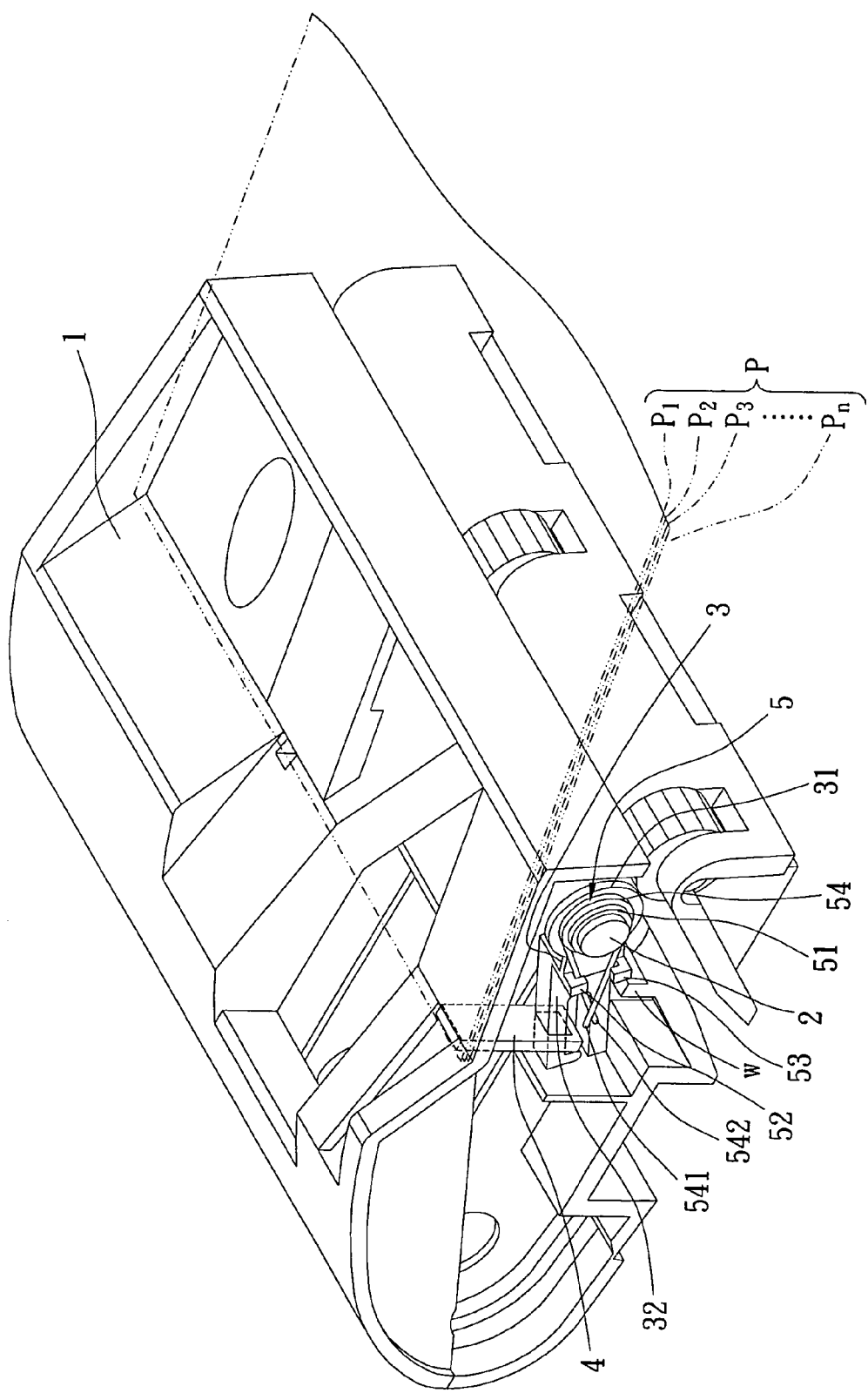
FIG. 4 is a schematic view showing an application of the present invention.
Figure 10:
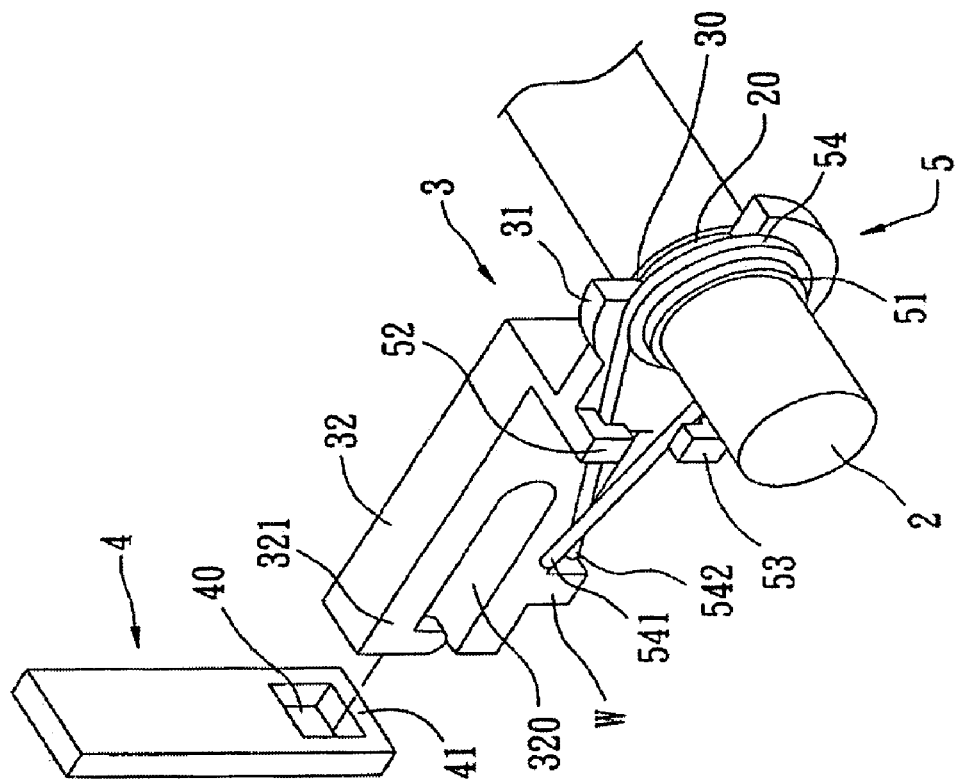
FIG. 10 is a perspective view of a perspective view showing a connection status of a connection rod connected to a platen of the present invention.

Referring to FIGS. 3 and 4, the present invention relates to a mobile paper guide adapted to an office machine, e.g., photocopier, printer, facsimile machine or multi-purpose office machine provided with a mechanism of an automatic document feeder (ADF). The ADF includes a paper guide frame 1 containing one or a plurality of plate of paper P (including paper sheets P1, P2, P3 . . . Pn). The mobile paper guide includes a draft platen 2, a motor (not illustrated) to drive the draft platen 2 to rotate, one or a plurality of connection rod 3 inserted onto the draft platen 2, one or a plurality of paper guide plate 4 corresponding to the connection rod 3, one or plurality of torque limiting device 5 to adjust for a preset friction between the connection rod 3 and the draft platen 2, and a limiting part w disposed at where below the connection rod 3. Wherein, to feed paper, both of the draft platen 2 and the motor are the basic mechanisms inherited to the office machine; therefore, it is not necessary to provide additional transmission and roller. The draft platen 2 is provided with a circular locking slot 20 at where in relation to the connection rod 3 while a clamping part 30 is provided protruding from the connection rod at where in relation to the locking slot 20 so to secure the connection rod 3 to the draft platen 2. The mobile paper guide is provided beneath the paper guide frame 1. The paper guide frame 1 includes one or a plurality of chute 10 corresponding to a paper guide plate 4. The chute 10 permits the paper guide plate 4 to move up and down therein for the paper guide plate 4 to protrude out of the paper guide frame 1 from below to retain and align the paper sheet. The limiting part w may extend downward from the connection rod 3 as illustrated in FIG. 10 or is provided in the ADF as illustrated in FIG. 3 to make sure that the lowest level the paper guide plate 4 is permitted to travel downward would remain in the chute 10. As illustrated in FIG. 3, the limiting part w may be a structure inherited in the internal design of the office machine. The present invention takes the advantage of the inherited limiting part w to save production cost otherwise required in providing an additional limiting part.

Figure 6:
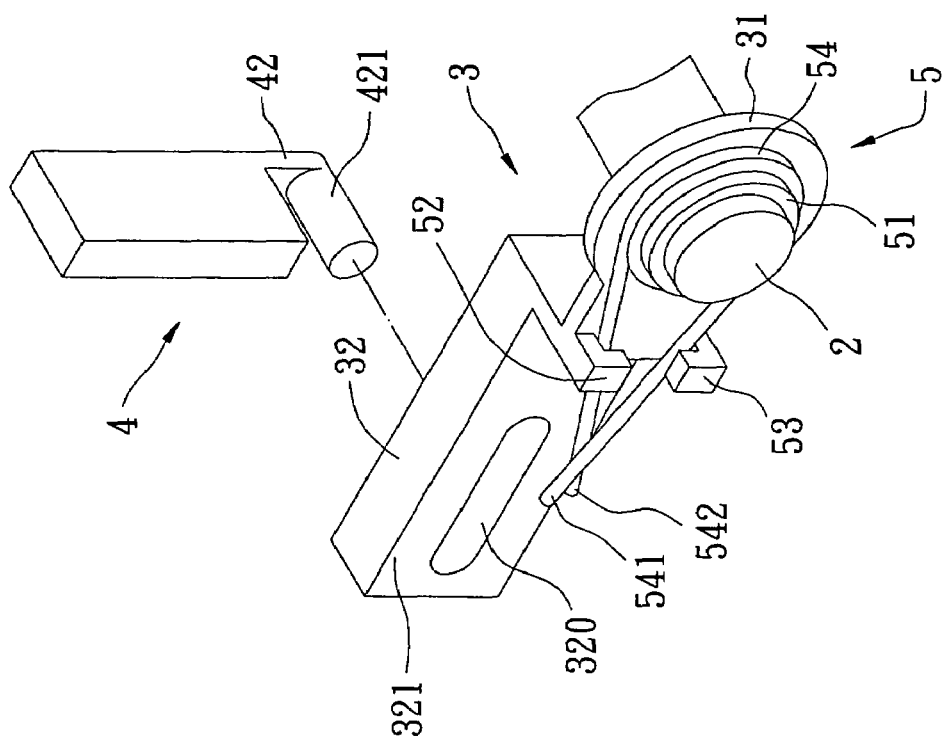
FIG. 6 is a perspective view of a connection status of a connection rod is connected to a paper guide plate in a second preferred embodiment of the present invention.
Figure 5:
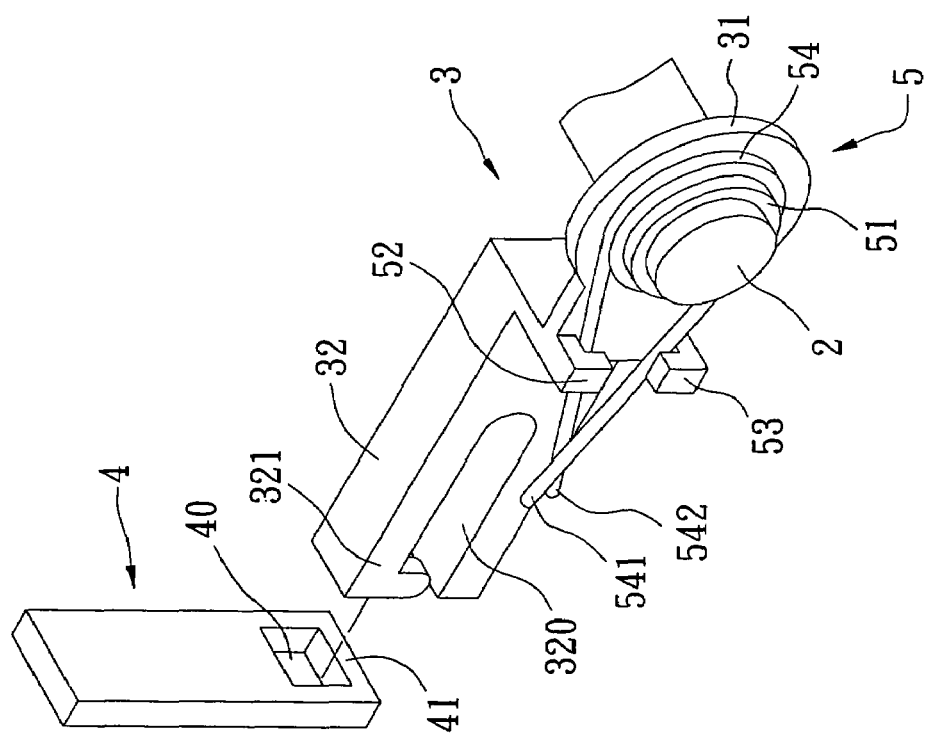
FIG. 5 is a perspective view of a connection status of a connection rod connected to a paper guide plate in a first preferred embodiment of the present invention.
Figure 7:
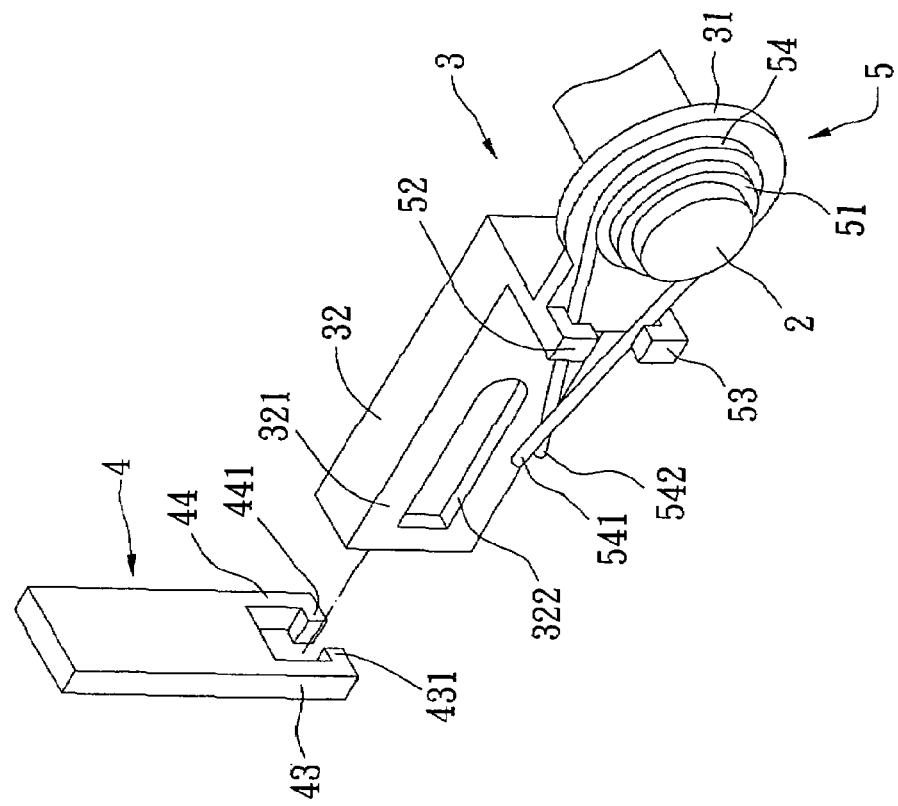
FIG. 7 is a perspective view of a connection status of a connection rod connected to a paper guide plate in a third preferred embodiment of the present invention.
Figure 8:
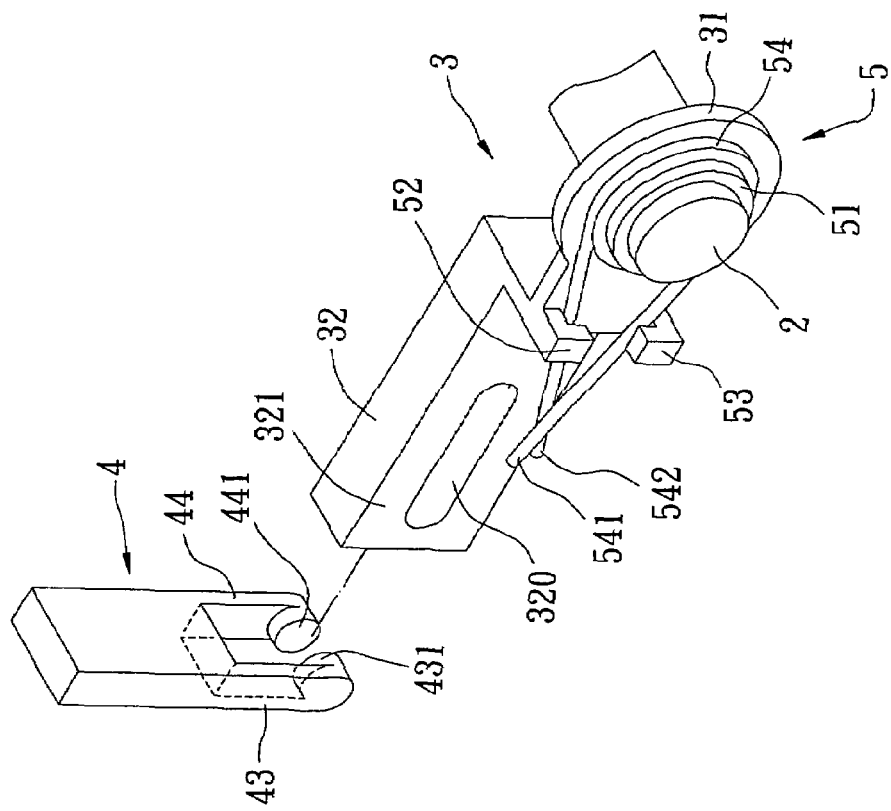
FIG. 8 is a perspective view of a connection status of a connection rod connected to a paper guide plate in a fourth preferred embodiment of the present invention.
Figure 9:
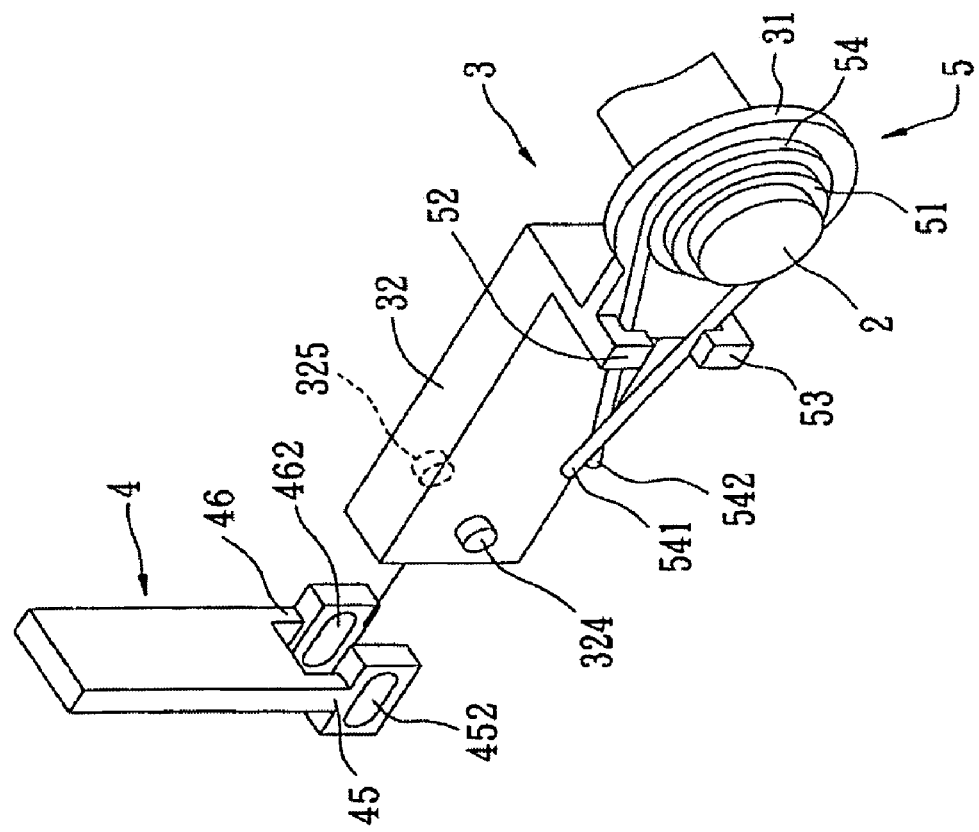
FIG. 9 is a perspective view of a connection status of a connection rod connected to a paper guide plate in a fifth preferred embodiment of the present invention.

The connection rod includes a knob 31 inserted onto the draft platen 2 and an arm 32 extending outwardly from the knob 31. A given friction is preset between the knob 31 and the draft platen 2 for the connection rod 3 to rotate as driven by the draft platen 2 and for both of the connection rod 3 and the draft platen 2 to turn around against each other when the connection rod is limited. The paper guide plate 4 is relatively and movably provided to the arm 32 extended from the connection rod 3. Wherein, the connection status between the connection rod 3 and the paper guide plate 4 also includes relative sliding and relative turning. To connect the connection rod 3 and the paper guide plate 4, the arm 32 extending from the connection rod 3 is provided with a guiding structure and the paper guide plate 4 is provided with a sliding structure. As illustrated in FIG. 5 for a connection status between the connection rod 3 and the paper guide plate 4 of a first preferred embodiment of the present invention, the arm 32 extending from the connection rod 3 is provided with a notch 320 to form a fastener 321 at its tip as the guiding structure. An opening 40 is disposed at the lower end of the paper guide plate 4 and closed at its tail to form a joint arm 41 as the sliding structure; the joint arm 41 of the paper guide plate 4 slides into the notch 320; and the fastener 321 penetrates the opening 40 of the paper guide plate 4 so that the paper guide plate 4 locks up the extension arm 32 by surrounding it. As illustrated in FIG. 6 for a connection status between the connection rod 3 and the paper guide plate 4 in a second preferred embodiment of the present invention, the arm 32 extending from the connection rod 3 is provided with a notch 320 to form a fastener 321 at its tip as the guiding structure; the paper guide plate 4 extends downward a support arm 42 and a slide 421 in turn extends sideway from the support arm 42 as the sliding structure; and the slide 421 of the paper guide plate 4 slides into the notch 320 of the extension arm 32 for the paper guide plate 4 to be locked to the extension arm 32. Another status yet of the connection between the connection rod 3 and the paper guide plate 4 in a third preferred embodiment of the present invention as illustrate din FIG. 7, the arm 32 extending from the connection rod 3 is provided with a notch 320 to form a fastener 321 at its tip as the guiding structure; a left support arm 43 and a right support arm 44 extend downward from the paper guide plate 4; and two sliding members 431, 441 respectively extend further from both support arms 43, 44 as the sliding structure; and both sliding members 431, 441 of the paper guide plate 4 are disposed in the notch 320 of the extension arm 3 for the paper guide plate 4 to be locked to the extension arm 32. Referring to FIG. 8 for a fourth preferred embodiment of the present invention showing another connection status yet between the connection rod 3 and the paper guide plate 4, a left sliding channel 322 and a right sliding channel 323 are disposed to the arm 32 extending from the connection rod 3 as the guiding structure; both support arms 43, 44 extend downward from the paper guide plate 4; both sliding members 431, 441 respectively extend from both support arms 43, 44 as the sliding structure; and both sliding members 431, 441 of the paper guide plate 4 respectively slide into both sliding channels 322, 323 of the extension arm 32 for the paper guide plate 4 to slide into the extension arm 32. Alternatively, the arm 32 extending from the connection rod 3 is provided with a sliding structure and the paper guide plate 4 is provided with a guiding structure. As illustrated in FIG. 9 for another connection status yet between the connection rod 3 and the paper guide plate 4 of a fifth preferred embodiment of the present invention, a left pole 324 and a right pole 325 are disposed to the arm 32 extending from the connection rod; both support arms 45, 46 extend downward from the paper guide plate 4; two chutes 452, 462 are respectively provided to both support arms 45, 46 as the guiding structure; both poles 324, 325 of the extension arm 32 respectively slide into both chutes 452, 462 of the paper guide plate 4 for the extension arm 32 to slide in the paper guide plate 4. Now referring to FIG. 10, the draft platen 2 is provided with a circular locking slot 20 at where in relation to the knob 31 of the connection rod 3 while a clamping part 30 is provided protruding from the knob 31 at where in relation to the locking slot 20 so to secure the connection rod 3 to the draft platen 2.

Wherein, the paper guide plate 4 is relatively and movably provided to the terminal of the arm 32 extending from the connection rod 3 for all those preferred embodiments describer to be realized at the terminal of the extension arm 32.

The torque limiting device 5 provided to ensure sufficient rotation force for the connection rod 3 includes a circular connection part 51 extending sideway from the knob 31 of the connection rod 3, an upper and a lower clamping parts 52, 53 extending sideway from the extension arm 32 of the connection rod 3, and a torque spring 54. The torque spring 54 is mounted on the circular connection part 51. Two tails 541, 542 extend from the torque spring 54 in the direction facing the extension arm 32 and are limited respectively in the upper and the lower clamping parts 52, 53 to restrict the connection rod to the draft platen 2 by the torque limiting device 5 while rotating synchronously with as driven by the draft platen 2. When the connection rod 3 as driven by the draft platen 2 to turn around clockwise, the paper guide plate 4 is driven by the connection rod 3 to project out of the paper guide frame 1 to retain paper sheets P and sort front edges of those paper sheets P. On the contract, when the connection rod 3 as driven by the draft platen 2 turns around counter-clockwise, the paper guide plate 4 descends as driven by the connection rod 3 and the connection rod 3 is prevented from continuous rotation downward due to the existence of the limiting part w. However, the draft platen 2 continues to rotate counter-clockwise, both of the connection rod 3 and the draft platen 2 are turning around against each other to force the guide paper plate 4 to be accommodated in the chute 10 of the paper guide frame 1 without leaving the chute 10 thus to fail its function. The preset friction between the connection rod 3 and the draft platen 2 must be sufficient for the draft platen 2 to drive the connection rod 3 and for both of the connection rod 3 and the draft platen 2 to turn around against each other when the connection rod 3 is limited.

Furthermore, whereas all components of the mobile paper guide are assembled centering on the draft platen 2, and allowed to be assembled in a module before being adapted to the office machine. Accordingly, the present invention corrects the over consumption of time and efforts found with the first prior art that all components must be independently assembled. The present invention also allows easy service since all the components can be inspected or replaced as a module. In case of multiple connection rods 3 are provided for the mobile paper guide, they are not made integrated to complete the manufacturing so that the asymmetric status of both ends due to deformation or the status of falling out of place due to leverage effects as found with the second prior art are eliminated.

The mobile paper guide of the present invention can further prevent man-made error in placing the paper sheets on the paper guide frame. Whereas the operation fashion varies depending on the individual user, the location where paper sheets are placed may not be necessarily the same each time. The paper sheets may slide over the paper sent device to cause jammed paper sheets or failure in sending the paper sheets, and the malfunction of the paper guide not only results in the inconvenience to the user but also cerates excessively financial burden of service costs.

To sum up, the mobile paper guide of the present invention provides the following advantages:

1. It effectively retains and sorts the front edge of paper sheet for preventing the paper sheet from being jammed;
2. It requires no production or adaptation of additional power device to help lower the production cost by taking advantage of coupling to the inherited paper feeding motor of the office machine.
3. It achieves its function by means of a simple mechanism at reduced production cost and steps required for the assembly while allowing to be made in module for saving the effects and time consumed; and
4. It prevents both ends of the paper guide becoming asymmetric due to deformation and avoids falling out of position due to leverage effects.

However, it is to be noted that that the preferred embodiments disclosed in the specification and the accompanying drawings are not limiting the present invention; and that any construction, installation, or characteristics that is same or similar to that of the present invention should fall within the scope of the purposes and claims of the present invention.

We claim:

1. A mobile paper guide adapted to an automatic document feeder is comprised of:
    a draft platen;
    one or a plurality of connection rod including a knob inserted onto the draft platen and an arm extending outwardly from the knob; a preset friction being provided at where between the knob and the draft platen; the connection rod rotates as driven by the draft platen; and both of the connection rod and the draft platen turning around against each other as the connection rod being limited in position; and
    one or a plurality of paper guide plate relatively and movably disposed to the arm extending from the connection rod;
    the automatic document feeder including one or a plurality of chute disposed in relation to where above the paper guide plate; and the paper guide moving up and down in the chute to retain and align the paper sheet,
    wherein the draft platen is provided with a circular locking slot at where in relation to the connection rod; and a clamping part is provided protruding from the connection rod at where in relation to the locking slot to secure the connection rod to the draft platen.

* * * * *

UNITED STATES PATENT AND TRADEMARK OFFICE
CERTIFICATE OF CORRECTION

PATENT NO.      : 7,636,541 B2                                              Page 1 of 1
APPLICATION NO. : 11/121047
DATED           : December 22, 2009
INVENTOR(S)     : Yeh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this

Ninth Day of November, 2010

David J. Kappos
*Director of the United States Patent and Trademark Office*